Patented Nov. 25, 1941

2,264,034

UNITED STATES PATENT OFFICE 2,264,034

REACTION OF UNSATURATED ALDEHYDES WITH DISSIMILAR ALDEHYDES AND KETONES

Clyve C. Allen, San Francisco, Calif., assignor to Shell Development Company, San Francisco, Calif., a corporation of Delaware No Drawing. Application March 13, 1939, Serial No. 261,626

18 Claims. (Cl. 260—64)

This invention relates to a process for effecting the reaction of a readily polymerizable unsaturated aldehyde with a dissimilar aldehyde or ketone, and to the new and useful compositions of matter resulting from said process.

Methacrolein and many other alpha-substituted acroleins as well as certain beta-substituted acroleins possess an inherent tendency to undergo autopolymerization with themselves and give infusible and insoluble resinous bodies in this way which are of very little value. Acidic or basic substances which act as catalysts for promoting the reaction of an aldehyde with other aldehydes or ketones also act as catalysts for the polymerization of these readily autopolymerizable unsaturated aldehydes. Methacrolein and related alpha-substituted acroleins spontaneously autopolymerize even in the absence of heat, light, and oxygen to useless polymolecular forms and if acidic or basic substances are present, this change is considerably more rapid. For these reasons, little or no success has been achieved by attempting to react a readily autopolymerizable unsaturated aldehyde with a dissimilar aldehyde or ketone.

Now, I have found that valuable and useful products of quite different character from the infusible and insoluble polymers of readily polymerizable substituted acroleins may be prepared by having a polymerization inhibitor present with a basic-acting catalyst in the reaction mixture when the readily autopolymerizable unsaturated aldehyde is reacted in the liquid phase with a dissimilar aldehyde or ketone. The polymerization inhibitor retards the autopolymerization of the unsaturated aldehyde and allows it to react with the dissimilar aldehyde or ketone present. By this method, the desired reaction products may be obtained, and the formation of the undesired autopolymerization products may be substantially obviated.

It is an object of the present invention to provide a process which substantially prevents the autopolymerization of readily polymerizable unsaturated aldehydes to infusible and insoluble polymers and promotes the reactions of them with dissimilar aldehydes or ketones so that plastic resinous products may be obtained which have valuable and useful properties for a variety of purposes.

Suitable unsaturated aldehydes for use in the process include acroleins with a hydrogen atom on the alpha- or beta-carbon atom substituted by a halogen atom such as alpha-chloracrolein, alpha-bromacrolein, beta-chloracrolein, beta-bromacrolein and the like. A preferred subclass of readily autopolymerizable unsaturated aldehydes embraces the alpha-substituted acroleins with an unsaturated tertiary carbon atom directly linked to the aldehyde group. These aldehydes are conveniently represented by the formula

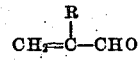

wherein R is an organic radical. R may be an alkyl radical as methyl, ethyl, propyl, butyl, amyl, etc.; an alkenyl radical as ethenyl, propenyl, butenyl, pentenyl, etc.; an aryl or aralkyl radical as phenyl, tolyl, xylyl, naphthyl, anthryl, benzyl, phenylethyl, phenylpropyl, etc.; an alicyclic radical as cyclopropyl, cyclobutyl, cyclopentyl, cyclohexyl, etc.; a heterocyclic radical as thienyl, pyrrolyl, furyl, etc.; and their homologues and analogues as well as these radicals with one or more of their hydrogen atoms substituted by a suitable inorganic or organic substituent such as a halogen atom, a hydroxy group, a carbinol group, an alkoxy group, an aralkoxy group, an aryl oxy group, etc.

The readily autopolymerizable unsaturated aldehydes may be reacted with any dissimilar aldehyde or ketone in accordance with the process of the invention. The class of compounds embraced by the term "dissimilar aldehydes" includes the compounds described above as well as other aldehydes of which the following are representative: formaldehyde, acetaldehyde, propionaldehyde, butyraldehyde, isobutyraldehyde, valeraldehyde, isovaleraldehyde, benzaldehyde, toluic aldehydes, xylylic aldehydes, alpha-phenyl-propionaldehyde, alpha-phenyl-butyraldehyde, hydro-cinnamic aldehyde, cuminol, furfural, crotonaldehyde and the like together with their homologues, analogues, and suitable substitution products such as the halogenated aldehydes, aldols, etc. Representative ketones include acetone, methyl ethyl ketone, methyl propyl ketone, methyl isopropyl ketone, diethyl ketone, methyl butyl ketone, methyl isobutyl ketone, cyclopentanone, cyclohexanone, methyl vinyl ketone, methyl isopropenyl ketone, mesityl oxide, acetophenone, propiophenone, acetyl-tuluol, acetyl-mesitylol, benzyl ethyl ketone, benzyl propyl ketone and the like as well as homologues, analogues and suitable substitution products including halogenated ketones, ketols, ketonic acids, etc.

Many substances are effective in inhibiting the autopolymerization of the unsaturated aldehydes to the undesirable, infusible and insoluble polymers. Substances which are suitable for use as autopolymerization inhibitors include such classes of compounds as the phenolic compounds, the quinones, the amines, the alkylolamines and the nitro-aryl compounds. The phenolic compounds are those which have one or more hydroxy groups linked to an aromatic nucleus. Representative phenolic compounds are phenol, the cresols, the xylenols, the naphthols, cumenol, carvacrol, thymol, eugenol, catechol, resorcinol, pyrogallol, hydroquinone, orcinol, guaiacol, phloroglucinol, pyrocatechol, etc., while representative quinones are benzo-quinone, naphtho-quinone, phenanthrene-quinone, etc. The amines include primary, secondary, and tertiary amines such as methyl amine, dimethyl amine, trimethyl amine, ethyl amine, diethyl amine, triethyl amine, ethyl propyl amine, aniline, the toluidines, the xylidines, the phenyl naphthyl amines, diphenyl amine, dibenzyl amine, ethylene diamine, the phenylene diamines, the toluene diamines, piperidine, pyridine, diphenyl quanidine, benzidine, tetra-phenyl hydrazine, aminodimethylaniline, etc.; the aldehyde-ammonia and aldehyde-amine condensation products such as acetaldehyde-ammonia, isobutylaldehyde-ammonia, benzaldehyde-ammonia, acetaldehyde-ethyl amine, acetaldehyde-aniline, etc.; and the aminophenols, aminocresols, aminoxylenols, aminonaphthols, methylaminophenols, benzylaminophenols and the like. Typical alkylolamines are mono-, di- and tri-ethanolamines, -propanolamines, -butanolamines, etc.; while the nitro aryl compounds include nitrobenzene, trinitrobenzene, nitrophenols, nitrosophenols, aminonitrophenols, etc. Certain inorganic materials may be used as autopolymerization inhibitors which include among others the halogens such as bromine and iodine, copper and the copper alloys, and elemental sulfur, selenium and tellurium as well as the organic compounds containing these last three elements such as the mercaptans, sulfides, polysulfides, thioacids, thioesters and the like together with the selenium and tellurium analogues.

The invention is not limited to the use of any specific proportion of autopolymerization inhibitor in the reaction mixture. However, the amount of inhibitor employed should be sufficient to substantially prevent the formation of undesirable polymers of the unsaturated aldehyde. The particular amount of inhibitor to be used will depend upon the specific inhibitor used, the particular basic-acting catalyst employed, the reactants chosen, and the conditions under which the reactions are allowed to proceed. If desired, a plurality of suitable substances may be used to inhibit the autopolymerization.

In order to effect the reaction, a basic-acting catalyst must be used. Suitable substances for this purpose are basic oxides, basic hydroxides, and basic-acting salts. The alkali metal oxides, alkali metal hydroxides, alkaline earth oxides, alkaline earth hydroxides, basic-acting alkali metal salts, and alkali metal alcoholates are particularly suitable as catalysts. These substances may be employed in solution with water, alcohol or other suitable solvents or they may be added to the reaction mixture in substantially pure form as solids. Preferred groups of basic-acting catalysts are the alkali metal hydroxides and alkali metal cyanides. Several substances may be used at the same time, if desired. For example, a mixture of sodium hydroxide and calcium hydroxide which may be conveniently employed is readily available in the markets under the name of soda-lime.

The process of the invention may be executed in a variety of suitable manners. For example, the readily autopolymerizable unsaturated aldehyde with which is incorporated the autopolymerization inhibitor may be added slowly, intermittently, or all at substantially the same time to the dissimilar aldehyde or ketone containing the basic-acting catalyst. It is convenient, though not essential, to incorporate the inhibitor in the unsaturated aldehyde. By this method, the unsaturated aldehyde can be stabilized against autopolymerization over considerable periods before use. However, when desired, freshly prepared readily polymerizable aldehyde may be used sufficiently soon so that substantially no autopolymerization has had time to occur. It is usually preferable to either add the autopolymerization inhibitor with one of the reactants or have it present in the reaction mixture before or at the same time the basic-acting catalyst is introduced. Bringing together the unsaturated aldehyde with the dissimilar aldehyde or ketone in the absence of the inhibitor, but in the presence of the basic-acting catalyst, is not desirable because the catalyst also catalyzes the autopolymerization of the unsaturated aldehyde. On the other hand, a mixture of the unsaturated aldehyde with a dissimilar aldehyde or ketone containing the inhibitor may be kept for long periods without any apparent reaction taking place provided the basic-acting catalyst is absent. Upon addition of the catalyst to such a mixture the desired reaction, in some cases, starts immediately.

The properties of the reaction products may be controlled to some extent by agitation of the reaction mixture, which may be done in many ways such as by stirring, for example. When the unsaturated aldehyde is added to the aldehyde or ketone slowly or intermittently, vigorous agitation distributes the added aldehyde throughout the reaction mass and aids the desired reactions. Another method of controlling the character of the products is by having diluents present in the reaction mixtures. The diluents should preferably be substances which are unreactive and remain unchanged in the presence of any of the materials in the reaction mixtures such as alcohols, polyhydric alcohols, ethers, paraffinic and aromatic hydrocarbons, halogenated hydrocarbons and the like.

In general, heat is evolved by the reactions so that a means of cooling the reaction mixture may be used if it is desired to conduct the reaction at constant temperature. The cooling may be accomplished by circulating cold material through coils in the reaction vessel or the reaction vessel may be immersed in a cooling bath. Adding the unsaturated aldehyde in only small amounts is helpful in allowing the heat to be dissipated away and controlling the temperature.

The temperature at which the reaction is conducted also has an effect on the character of the products obtained. For example, products of higher molecular weight are obtained when the reaction is allowed to proceed at temperatures below 0° C. than with temperatures near room temperature, other things being equal. The process may however be executed at any temperature up to the boiling point of the reaction mixture depending upon the particular product desired, the autopolymerization inhibitor and catalyst used, and the reactants employed. Ordinarily, temperatures of less than 50° C. are preferably employed, but when products of high molecular weight are desired, temperatures below 0° C. may be used. Conducting the reaction under atmospheric pressure is usually most desirable, although when conditions make it advantageous, superatmospheric or subatmospheric pressures may be used.

Since, from an economic standpoint, the readily polymerizable unsaturated aldehyde is usually more valuable than the aldehyde or ketone with which it is reacted, it is preferable to conduct the reaction under conditions where all or nearly all of the unsaturated aldehyde is reacted. One of the ways of promoting this is by having the molecular ratio of dissimilar aldehyde or ketone to unsaturated aldehyde greater than one in the reaction mixture, i. e. the reaction is executed with a molecular excess of dissimilar aldehyde or ketone. The unreacted materials may be recovered and reused. Another method is by allowing ample time for the reactants to react. Usually several hours are necessary for the reactants to become sufficiently reacted so that the desired products are obtained, but under some conditions considerably more time may be required.

At the conclusion of the reaction, the products may be recovered in a variety of suitable manners obvious to those skilled in the art. If desired, the basic-acting catalysts may be neutralized before the recovery of products is started or the catalysts may be allowed to remain unchanged so that further reaction will occur during the recovery. Distillation is the preferred method of separating the unreacted components from the reaction mass. This is also a desirable method, especially when done under subatmospheric pressures, for segregating the products of the reaction.

The resinous products of the reactions are very useful and novel materials which are plastic masses substantially soluble in a variety of organic solvents. Suitable solvents for the resins include oxygenated organic solvents like alcohols such as ethyl alcohol, isopropyl alcohol, normal butyl alcohol, secondary butyl alcohol, etc.; esters such as ethyl acetate, isopropyl acetate, normal butyl acetate, secondary butyl acetate, etc.; and ketones such as acetone, methyl ethyl ketone, methyl propyl ketone, methyl isobutyl ketone, mesityl oxide, etc.; as well as aromatic hydrocarbons such as benzene, toluene, xylene, etc. Dissolved in solvents and/or incorporated with other substances the products make useful coating compositions, impregnating compositions and the like.

The following examples are given for the purpose of illustrating a few of the modes of executing the process of the invention:

Example I

About 2 gm. of KCN was dissolved in 10 cc. of water and the solution added to about 395 gm. of acetone in a three-necked flask wherein the mixture was chilled to approximately —8° C. The flask was fitted with a stirring device and a reflux condenser. About 126 gm. of methacrolein containing 0.7% hydroquinone was added dropwise to the acetone mixture over a period of approximately three hours. The rate of addition of the methacrolein was controlled so that the temperature of the reaction mixture did not rise appreciably. After addition of the aldehyde, the mixture was allowed to stand at room temperature for about 17 hours. The mixture was then distilled at atmospheric pressure until the still head temperature reached about 100° C. By this means, the excess acetone, unreacted methacrolein and water were removed. An energetic exothermic reaction thereupon took place, indicating further reaction was progressing. After cooling, the residue was dried at room temperature over sulfuric acid in a vacuum desiccator under 3 mm. mercury pressure. The vacuum residue, amounting to about 133 gms., was a soft plastic resin.

Example II

About 2 gm. of KCN was dissolved in 10 cc. of water and added to about 780 gm. of chilled acetone. About 0.5 gm. of iodine was also added to the acetone. About 129 gm. of methacrolein was then added dropwise to the mixture which was stirred efficiently. The addition required about three hours and care was taken that the temperature of the mixture was maintained at about —14° C. After the addition, the mixture was distilled to 60° C. under 5 mm. mercury pressure. By analysis of the distillate it was determined that less than 5 gms. of methacrolein was unreacted. The residue from the distillation was a resinous mass weighing about 98 gm. Fractionation of the distillate under atmospheric pressure to a temperature of 75° C. yielded 89 gm. of an oily residue.

Example III

About 780 gm. of acetone was chilled to about —10° C. in a three-necked flask and approximately 50 gm. of soda-lime added. Then about 126 gm. of methacrolein containing 0.1% hydroquinone was introduced dropwise with vigorous agitation of the mixture over a period of about 3 hours and the mixture was allowed to stand overnight. The involatile residue on distillation to 60° C. at 5 mm. mercury pressure amounted to 78 gm. Fractionation at atmospheric pressure to 75° C. of the distillate gave 102 gm. of oily reaction product.

Example IV

About 1000 gm. of acetone was added to about 2.5 gm. of KOH dissolved in 40 gm. of methyl alcohol. With all materials at room temperature, (22° C.) about 126 gm. of methacrolein containing 0.1% hydroquinone mixed with about 532 gm. of acetone was poured into the above described mixture. The resulting mixture was let stand for about 40 hours and was then spot evaporated at 60° C. under 3 mm. mercury pressure. The resinous residue weighed about 130 gm. while distillation of the volatile material to 75° C. gave about 121 gm. of oily residue. Analysis of the products showed all of the methacrolein had reacted.

Example V

About 2 gm. of KCN was dissolved in 10 cc. of water and the solution mixed with about 2534 gm. of methyl ethyl ketone. To this mixture was added about 126 gm. of methacrolein containing 0.1% hydroquinone mixed with 530 gm. of methyl ethyl ketone. The resulting mixture was allowed to stand for approximately 48 hours at room temperature (20° C.) and was then distilled to 60° C. at 2 mm. mercury pressure. The residue was about 33 gm. of soft resinous material while fractionation of the distillate to 80° C. yielded about 38 gm. of dark orange oily liquid.

Example VI

Methyl propyl ketone was condensed with methacrolein under exactly the same conditions as the methyl ethyl ketone described in Example V. Vacuum distillation yielded about 12 gm. of residue and about 40 gm. of residue was obtained on fractionation of the vacuum distillate.

*Example VII*

About 5 gm. of KCN was dissolved in 15 cc. of water and the solution mixed with 1000 gm. of mesityl oxide containing about 3 gm. of hydroquinone. About 126 gm. of methacrolein was mixed with 532 gm. of mesityl oxide and the mixture slowly added to the above-described mesityl oxide solution. The container with the mixture was immersed in a bath at 50° C. for four hours. At the end of this time it was determined that methacrolein was still present so an additional 3 gm. of KCN was added and the mixture was vigorously agitated for 5 hours more at 50° C. At the end of this time it was noted that the odor of methacrolein was absent. The reaction mixture was spot distilled in a bath at 70° C. and under 2 mm. mercury pressure. This yielded about 212 gm. of dark brown resinous material as residue.

*Example VIII*

About 35 gm. of methacrolein containing 0.1% hydroquinone was mixed with about 56 gm. of cyclohexanone and about 0.9 gm. of powdered calcium oxide as catalyst was added. The mixture was then heated and maintained at a temperature of about 95° C. for 14 hours. At the end of this time, a small amount of water was added to the reaction mixture and it was steam distilled. All but a trace of the methacrolein had reacted. The residue from the steam distillation weighed about 48 gm. and consisted of a dark brown viscous product.

The residues obtained from the vacuum distillation in the above examples were plastic masses soluble in common organic solvents.

Although the invention has been disclosed hereinbefore with certain specific embodiments and variants thereof, it is to be understood that my invention is to be limited only by the scope of the appended claims.

I claim as my invention:

1. A process for the preparation of plastic resinous products which comprises reacting methacrolein with acetone in the presence of hydroquinone and an alkali metal cyanide.

2. A process for the preparation of plastic resinous products which comprises reacting methacrolein with acetone in the presence of a phenolic compound and an alkali metal cyanide.

3. A process for the preparation of plastic resinous products which comprises reacting methacrolein with acetone in the presence of an autopolymerization inhibitor and a basic-acting alkali metal compound.

4. A process for the preparation of plastic resinous products which comprises reacting methacrolein with a dissimilar compound of the class consisting of aldehyde and ketones in the presence of an autopolymerization inhibitor and a basic-acting condensation catalyst.

5. A process for the preparation of plastic resinous products which comprises reacting methacrolein with a dissimilar aldehyde in the presence of hydroquinone and an alkali metal hydroxide.

6. A process for the preparation of plastic resinous products which comprises reacting an unsaturated aldehyde containing a terminal methylene group linked by both of its bonds to an unsaturated tertiary carbon atom which in turn is directly linked to the aldehyde group with a dissimilar aldehyde in the presence of a polymerization inhibitor and a basic-acting alkali metal compound.

7. A process for the preparation of plastic resinous products which comprises reacting methacrolein with mesityl oxide in the presence of hydroquinone and an alkali metal hydroxide.

8. A process for the preparation of plastic resinous products which comprises reacting an unsaturated aldehyde containing a terminal methylene group linked by both of its bonds to an unsaturated tertiary carbon atom which in turn is directly linked to the aldehyde group with a ketone in the presence of hydroquinone and an alkali metal hydroxide.

9. A process for the preparation of plastic resinous products which comprises reacting an unsaturated aldehyde containing a terminal methylene group linked by both of its bonds to an unsaturated tertiary carbon atom which in turn is directly linked to the aldehyde group with a ketone in the presence of a phenolic compound and an alkali metal hydroxide.

10. A process for the preparation of plastic resinous products which comprises reacting an unsaturated aldehyde containing a terminal methylene group linked by both of its bonds to an unsaturated tertiary carbon atom which in turn is directly linked to the aldehyde group with a dissimilar compound of the class consisting of aldehyde and ketones in the presence of an autopolymerization inhibitor and a basic-acting condensation catalyst.

11. A process for the preparation of plastic resinous products which comprises reacting a readily autopolymerizable unsaturated aldehyde of the alpha-substituted acroleins wherein the substituent is a halogen atom, the beta-substituted acroleins wherein the substituent is a halogen atom, and the unsaturated aldehydes containing a terminal methylene group linked by both of its bonds to an unsaturated tertiary carbon atom which in turn is directly linked to the aldehyde group with a dissimilar compound of the class consisting of aldehydes and ketones in the presence of an autopolymerization inhibitor and a basic-acting condensation catalyst.

12. A plastic resinous product resulting from the reaction of methacrolein with a dissimilar aldehyde.

13. A plastic resinous product resulting from the reaction of methacrolein with acetone.

14. A plastic resinous product resulting from the reaction of methacrolein with a ketone.

15. A plastic resinous product resulting from the reaction of an unsaturated aldehyde containing a terminal methylene group linked by both of its bonds to an unsaturated tertiary carbon atom which in turn is directly linked to the aldehyde group, with a ketone.

16. A plastic resinous product resulting from the reaction of a readily autopolymerizable unsaturated aldehyde of the group consisting of alpha-substituted acroleins wherein the substituent is a halogen atom, the beta-substituted acroleins wherein the substituent is a halogen atom, and the unsaturated aldehydes containing a terminal methylene group linked by both of its bonds to an unsaturated tertiary carbon atom which in turn is directly linked to the aldehyde group with a dissimilar aldehyde.

17. A plastic resinous product resulting from the reaction of a readily autopolymerizable unsaturated aldehyde of the group consisting of the alpha-substituted acroleins wherein the substituent is a halogen atom, the beta-substituted acroleins wherein the substituent is a halogen atom, and the unsaturated aldehydes containing a terminal methylene group linked by both of its bonds to an unsaturated tertiary carbon atom which in turn is directly linked to the aldehyde group with a ketone.

18. A plastic resinous product resulting from the reaction of methacrolein with methyl isopropenyl ketone.

CLYVE C. ALLEN.